United States Patent
Whitney et al.

(10) Patent No.: US 10,352,253 B2
(45) Date of Patent: Jul. 16, 2019

(54) METHOD TO PERFORM INTAKE CAM LIFT STATE TRANSITIONS

(71) Applicant: GM Global Technology Operations LLC, Detroit, MI (US)

(72) Inventors: Christopher E. Whitney, Commerce, MI (US); David N. Hayden, Ortonville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 96 days.

(21) Appl. No.: 15/674,980

(22) Filed: Aug. 11, 2017

(65) Prior Publication Data

US 2019/0048806 A1  Feb. 14, 2019

(51) Int. Cl.

| F01L 1/34 | (2006.01) |
|---|---|
| F02D 13/02 | (2006.01) |
| F16H 59/14 | (2006.01) |
| F16H 61/14 | (2006.01) |
| F02D 41/00 | (2006.01) |

(52) U.S. Cl.
CPC ...... F02D 13/0207 (2013.01); F02D 13/0211 (2013.01); F02D 13/0219 (2013.01); F16H 59/141 (2013.01); B60W 2510/0657 (2013.01); F02D 2041/001 (2013.01); F02D 2200/1002 (2013.01); F02D 2250/21 (2013.01); F16H 61/143 (2013.01); F16H 61/148 (2013.01)

(58) Field of Classification Search
CPC ......... F02D 13/0207; F02D 2200/1002; F02D 2250/21; F02D 13/0211; F02D 13/0219; F02D 2041/001; F16H 59/141; F16H 61/143; F16H 61/148; B60W 2510/0657

USPC ............................................ 123/90.16, 90.17
See application file for complete search history.

(56) References Cited

U.S. PATENT DOCUMENTS

| 7,077,084 B2* | 7/2006 | Mallebrein | F02D 13/0207 123/90.11 |
|---|---|---|---|
| 7,377,236 B2* | 5/2008 | Reed | F02D 41/008 123/21 |
| 8,495,981 B2* | 7/2013 | Stewart | F01L 1/34 123/179.16 |
| 2009/0070016 A1* | 3/2009 | Rayl | F01L 1/185 701/105 |
| 2011/0192380 A1* | 8/2011 | Tomimatsu | F02D 13/0249 123/493 |

\* cited by examiner

*Primary Examiner* — Zelalem Eshete

(57) ABSTRACT

A method of transitioning between two intake valve lift states while providing constant engine torque output comprehends the steps of receiving a lift change request from an engine control device, determining the current phase angles of the camshafts, and determining whether the intake and exhaust camshafts are at transition positions. The transition positions are experimentally or empirically determined combinations of operating conditions that result in constant engine torque output before and after the intake valve lift transition. If they are, an appropriate, i.e., low to high or high to low cam lift state transition of the intake valves occurs. If they are not, the cam phasers move the intake and exhaust camshafts to transition positions. When the cam phasers have moved the intake and exhaust camshafts to the transition positions, i.e., positions of constant engine torque output, the intake valve lift transitions from high to low or low to high.

19 Claims, 5 Drawing Sheets

METHOD TO PERFORM INTAKE CAM LIFT STATE TRANSITIONS

FIELD

The present disclosure relates to a method for transitioning between two intake cam lift states of an internal combustion engine and more particularly to a method of transitioning between a first and a second intake cam lift state of an internal combustion engine which provides essentially constant engine torque output.

BACKGROUND

The statements in this section merely provide background information related to the present disclosure and may or may not constitute prior art.

Variable valve timing and variable valve lift are two currently available and relied upon approaches for improving internal combustion engine performance and fuel economy. Broadly speaking, they achieve these goals by matching engine performance to then current torque demands. That is, under significant operator torque demands, such as accelerating onto an expressway, valve timing and lift are adjusted to achieve maximum power output and thus performance. Specifically, in a two state valve lift system, a high profile (lift) cam will be utilized which provides maximum valve lift and opening time when maximum engine torque output is required. While cruising at a constant speed, valve timing and lift are adjusted to achieve maximum fuel economy. Again in a two state valve lift system, a low profile (lift) cam will be utilized which provides reduced valve lift and opening time and improved fuel economy The existence and utilization of these two variables (lift and timing) and the two limits of their adjustment (high and low in the case of lift and advanced and retarded in the case of timing) quickly raises the questions of when, i.e., under what conditions, and how, i.e., with what electronic and mechanical means, the states of these two variables can be adjusted to achieve one or more engineering and performance goals.

Aside from the direct and inherent operational aspects of such devices, there are also consequential aspects. For example, while a system may sense operating conditions that necessitate a change of valve lift or timing, other operating conditions may not be conducive to such a change or may be upset by such a change. The ultimate criteria regarding whether a change can or should be made is generally the overall vehicle performance and whether a driver would experience any anomalous conditions or transients in engine power output. Thus such changes or adjustments should be made without any perceptible diminution or augmentation of engine power.

In practice, achieving a smooth valve lift state or valve timing transition often necessitates temporary adjustments to other engine operating systems and parameters. For example, momentary spark retard may be utilized to smooth the transition but this has its own adverse consequences. Another option, also with adverse consequences, involves briefly unlocking a locked torque converter clutch.

SUMMARY

The present disclosure is directed to a method of transitioning between high and low and low and high intake valve lift states while providing constant engine torque output so that such transitions are both smooth and essentially imperceptible to the vehicle operator. The method comprehends the steps of receiving a shift request from an engine control module (ECM) or similar control device, determining the instantaneous positions of the intake and exhaust cams, that is, the phase angles of the cam shafts, and thus whether the intake and exhaust cams are at transition positions. The transition positions are empirically determined combinations of operating conditions that result in constant engine torque output before, during and after the intake valve lift transition. If cam shafts are so positioned, the method requests an appropriate, that is, low to high or high to low cam lift state transition of the intake valves. If they are not, the method requests that the intake and exhaust cam phasers and cam shafts move to transition positions by actuating the cam shaft phasers. When the cam phasers have moved the intake and exhaust camshafts to the transition positions, the lift state transition request actuates the lift state transition to change the intake valve lift from high to low or low to high.

Application and utilization of the present disclosure in modern internal combustion engine powered vehicles results in improved drivability due to the smooth transitions between valve lift states and improved fuel economy because, first of all, the method preferably does not utilize spark retard to smooth the transitions and, second of all, the torque converter clutch can remain locked during such transitions. This results, as stated above, from transitioning between high and low or low and high intake valve lift states at constant engine torque output.

Thus it is an aspect of the present disclosure to provide a method of transitioning from a first cam lift state to a second cam lift state.

It is a further aspect of the present disclosure to provide a method of transitioning from a first cam lift state to a second cam lift state at essentially constant engine torque output.

It is a still further aspect of the present disclosure to provide a method of transitioning from either a high cam lift state to a low cam lift state or a low cam lift state or high cam lift state.

It is a still further aspect of the present disclosure to provide a method of transitioning from either a high cam lift state to a low cam lift state or a low cam lift state or high cam lift state while providing essentially constant engine torque output.

It is a still further aspect of the present disclosure to provide a method of transitioning from a first cam lift state to a second cam lift state while maintaining a torque converter in a locked state.

Further areas of aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
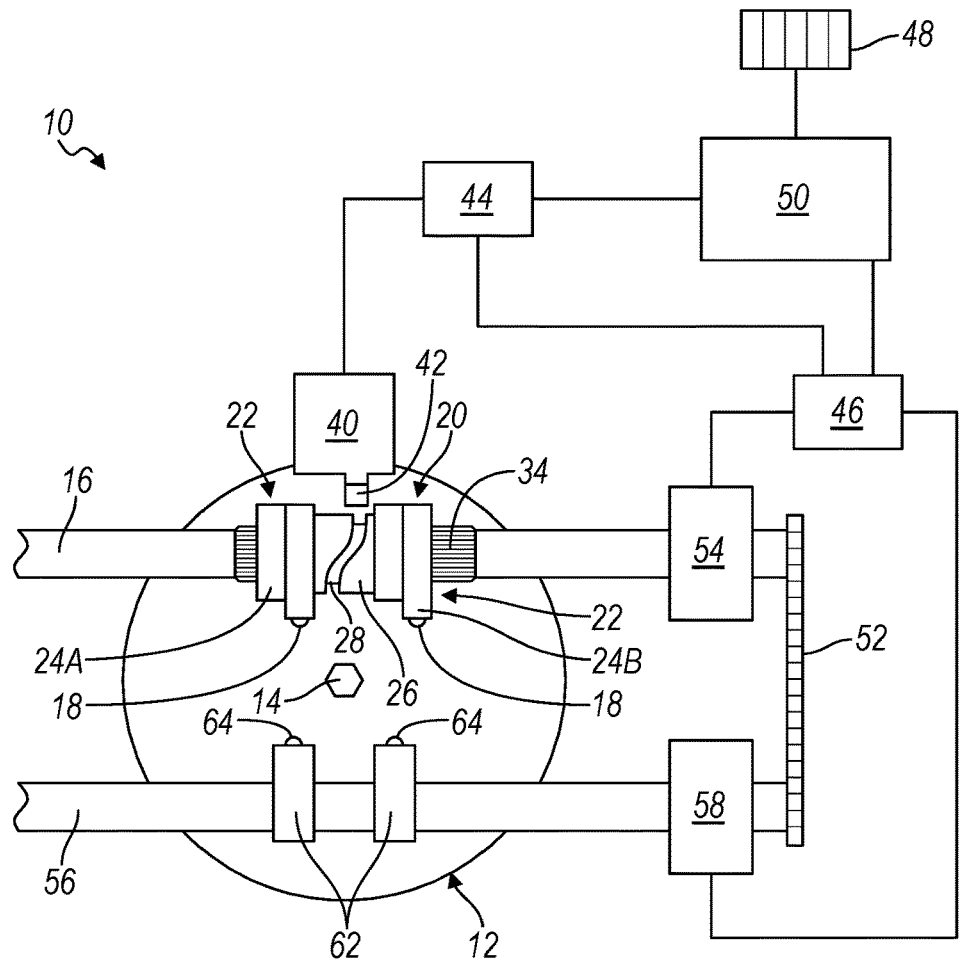
FIG. 1A is a diagrammatic view of a portion of an internal combustion engine for performing intake cam lift state transitions according to the present disclosure.
Figure 1B:
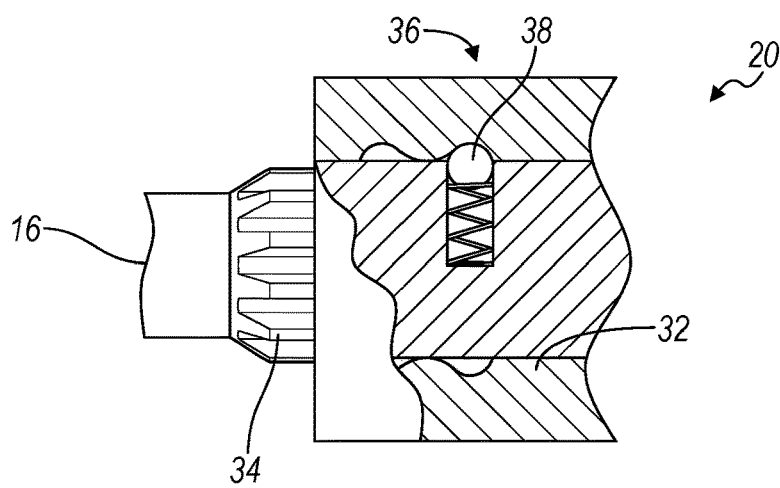
FIG. 1B is an enlarged, fragmentary view in partial section of the detent mechanism of an intake cam assembly according to the present disclosure.

With reference to FIGS. 1A and 1B, a portion of an internal combustion engine configured to perform intake cam lift state transitions according to the present method is illustrated and generally designated by the reference number 10. The engine 10 includes multiple piston and cylinder assemblies 12, one of which is illustrated in FIG. 1. A spark plug 14 is associated with each piston and cylinder assembly 12. Also associated with each piston and cylinder assembly 12 is an intake camshaft 16. In a four valve per cylinder internal combustion engine 10, the intake camshaft 16 reciprocates two intake valves 18 which are controlled by an intake cam assembly 20.

The intake cam assembly 20 includes two pairs of cams 22 each including a low lift cam 24A and an immediately adjacent high lift cam 24B. The pairs of cams 22 are axially separated or spaced apart by a cylindrical member 26 defining a cam track 28. The intake cam assembly 20 includes internal or female splines 32 which are complementary to and mate with male splines 34 on the intake camshaft 16, allowing the intake cam assembly to translate axially on the intake camshaft 16 while rotationally coupling the intake cam assembly 20 to the intake camshaft 16.

As illustrated in FIG. 1B, a detent mechanism 36 comprises a spring biased ball bearing 38 in the intake camshaft 16 which cooperates with a pair of axially adjacent grooves or channels in the intake cam assembly 20 to ensure positive selection and maintenance of two positions: a first, high lift position to the left and a second, low lift position to the right. A two position cam lift actuator 40 translates a pin or follower 42 that selectively extends into the cam track 28 and, as the intake camshaft 16 and the intake cam assembly 20 rotate, urges the intake cam assembly 20 from a first position illustrated if FIG. 1 in which the high lift cams 24B actuate the intake valves 18 to a second position to the right of that illustrated in FIG. 1 in which the low lift cams 24A actuate the intake valves 18.

The cam lift actuator 40 is controlled by a lift control module 44 that receives data and information from a phaser control module 46 regarding the current angular position of the intake camshaft 16. Data and information from an array of sensors 48 including, for example, a tachometer, a crank angle sensor, a manifold air pressure (MAP) sensor, a mass air flow (MAF) sensor, a throttle position sensor (TPS), a coolant temperature sensor as well as other sensors are provided to an engine control module (ECM) 50 which, among other actions, provides commands to the lift control module 44 and the phaser control module 46.

The intake camshaft 16 is driven by a timing belt or chain 52 which is, in turn, driven by the engine crankshaft (not illustrated). The angular position of the intake camshaft 16 may be adjusted relative to the engine crankshaft by an intake camshaft phaser 54 which is capable of advancing or retarding the position of the intake camshaft 16 relative to the engine crankshaft over a limited range as described with regard to FIG. 2, below.

The timing belt or chain 52 also drives an exhaust camshaft 56 through an exhaust camshaft phaser 58 which is likewise capable of advancing or retarding the position of the exhaust camshaft 56 relative to the engine crankshaft over a limited range. The exhaust camshaft 56 preferably includes two exhaust cams 62 for each piston and cylinder assembly 12 which are secured directly to the camshaft 56 and which reciprocate respective exhaust valves 64.

Figure 2:
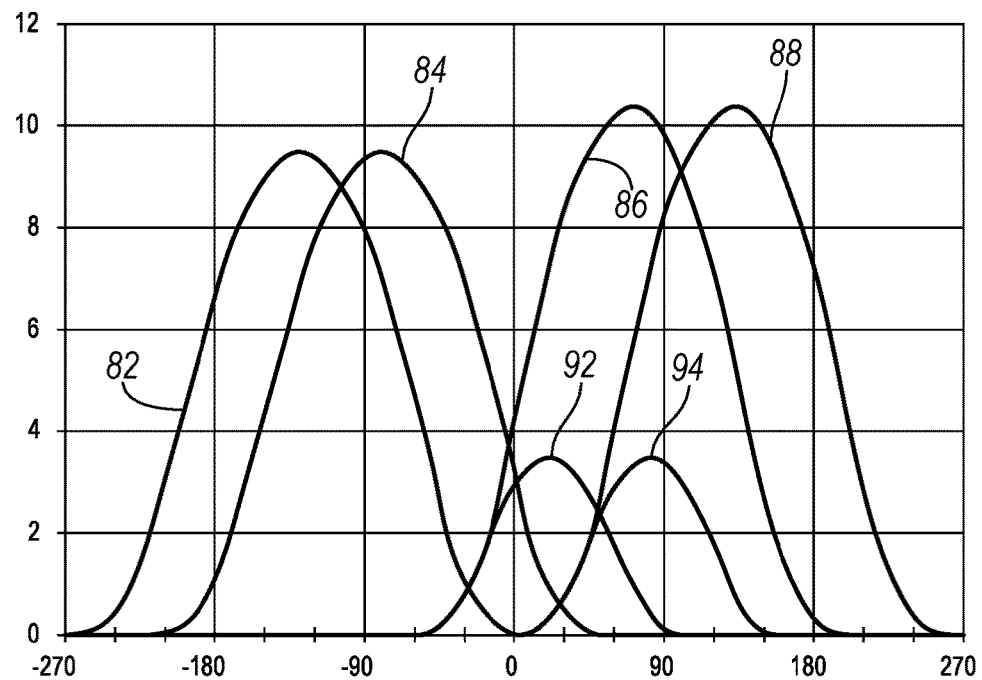
FIG. 2 is an exemplary graph of typical and representative intake and exhaust valve timing variations as well as intake high and low lift state variations.

Referring now to FIG. 2, an exemplary graph 80 of typical and representative intake and exhaust cam and valve timing variations as well as intake high and low lift cam and valve opening variations is presented. Crankshaft angle is on the horizontal (X) axis with 0° (TDC) appearing in the middle of the graph and valve lift in millimeters on the vertical (Y) axis. The curves to the left of center (0° crank angle) are exhaust valve curves: curve 82 presents advanced exhaust valve operation and curve 84 presents retarded exhaust valve operation. The curves to the right of center are intake valve curves: a curve 86 presents advanced, high lift intake valve operation, a curve 88 presents retarded, high lift intake valve operation, a curve 92 presents advanced, low lift intake valve operation, and a curve 94 presents retarded, low lift intake valve operation. Note that when the exhaust valves are advanced and the intake valves are retarded, there is no overlap of open valves whereas with retarded exhaust valves and advanced intake valves, significant open valve overlap occurs. Also note that the typical difference between advanced and retarded exhaust valves is on the order of 50° and that the typical difference between advanced and retarded intake valves is on the order of 60°.

Figure 3:
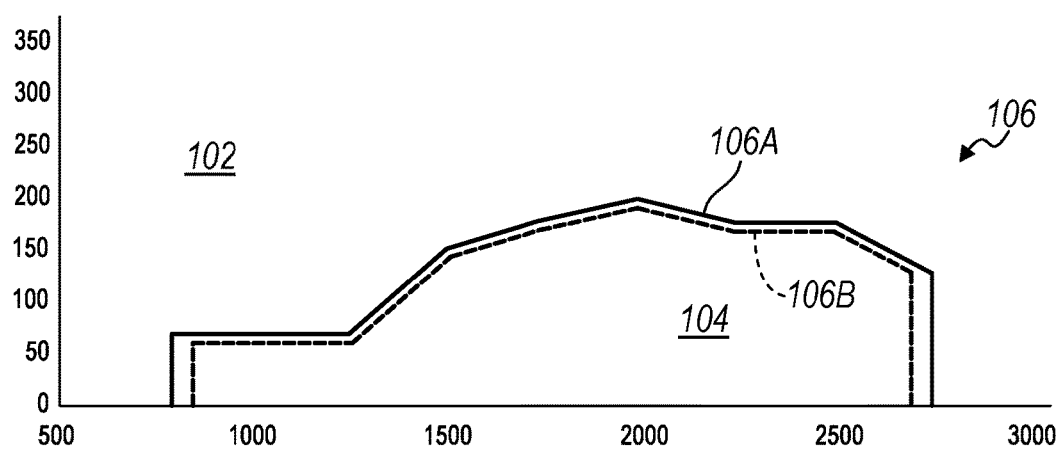
FIG. 3 is an exemplary graph illustrating typical performance of an internal combustion engine having variable valve lift in both high and low lift states.

Referring now to FIG. 3, an exemplary operational map 100 presenting engine speed on the horizontal (X) axis and indicated engine torque on the vertical (Y) axis illustrates those operational states or regions 102 and 104 where either the high lift cam and valve state (or mode) or the low lift cam and valve state (or mode) are available and feasible. A line dividing these regions is identified by the number 106. Note that the line 106 includes upper and lower constituents, an upper, bold line 106A and a lower, dashed line 106B. The upper, bold line 106A represents the exit threshold from the low lift state 104 and the lower, dashed line represents the entry threshold into the low lift state 104; the spacing between the lines 106A and 106B representing a designed in hysteresis that minimizes hunting of the control system between the two valve states 102 and 104.

It should be understood that operation in the high lift cam and valve state 102 provides maximum performance whereas operation in the low lift cam and valve state 104 provides maximum fuel efficiency and economy. While operation at low speeds and torques in the high cam and valve lift state 102 is entirely possible, operation at high speeds and torques in the low lift cam and valve state 104 will not provide the expected and desired performance. Thus, it is necessary to operate in the appropriate valve and cam state, either 102 or 104, commensurate with current driving conditions and demands and be able to shift between such states, both rapidly and with an absolute minimum of disturbance to the engine torque output and vehicle performance.

Figure 4:
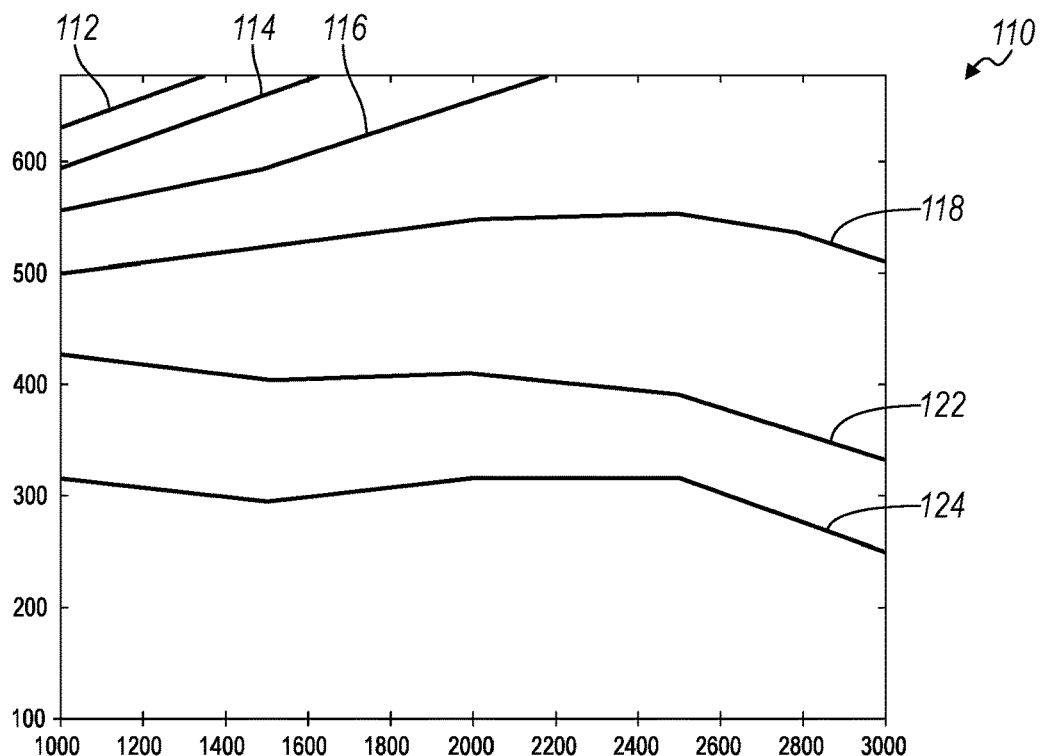
FIG. 4 is an exemplary graph with engine speed (RPM) on the horizontal (X) axis and air per cylinder (APC) in milligrams on the vertical (Y) axis illustrating the intake valve maximum opening position (IMOP) in degrees for a constant torque engine output at a valve state transition.

Referring now to FIG. 4, in order to achieve a smooth transition between a low cam and intake valve lift state (the curves 92 and 94 of FIG. 2) and a high cam and intake valve lift state (the curves 86 and 88 of FIG. 2) or vice versa, it is necessary to shift between cam and valve states under conditions which provide essentially constant engine torque output. FIG. 4 is an exemplary graph 110 with engine speed (RPM) on the horizontal (X) axis and air per cylinder (APC) in milligrams on the vertical (Y) axis which illustrates the intake valve maximum opening position (IMOP) in degrees which achieves this goal. In practice, the graph 110 is embodied in a look-up table utilized by the present method and includes several lines or curves which represent combinations of air per cylinder and engine speed which dictate the corresponding maximum opening position of the intake valves 18 (illustrated in FIG. 1) to which the intake cam phaser 54 (also illustrated in FIG. 1) adjusts the intake cam 16 prior to the high to low or low to high cam and valve lift shift, in order to provide essentially constant engine torque output during the shift. From top to bottom in the graph 110 of FIG. 4, the curve 112 represents 120°, the curve 114 represents 125°, the curve 116 represents 130°, the curve 118 represents 135°, the curve 122 represents 140°, the curve 124 represents 145° and the curve 126 represents 150°. It should be understood that the data of FIG. 4 are illustrative, are derived from analysis of a particular engine and are provided by way of example. Values for other engines will vary depending upon, for example, engine size, horsepower output, aspiration, fuel type and other mechanical and operational variables.

Figure 5:
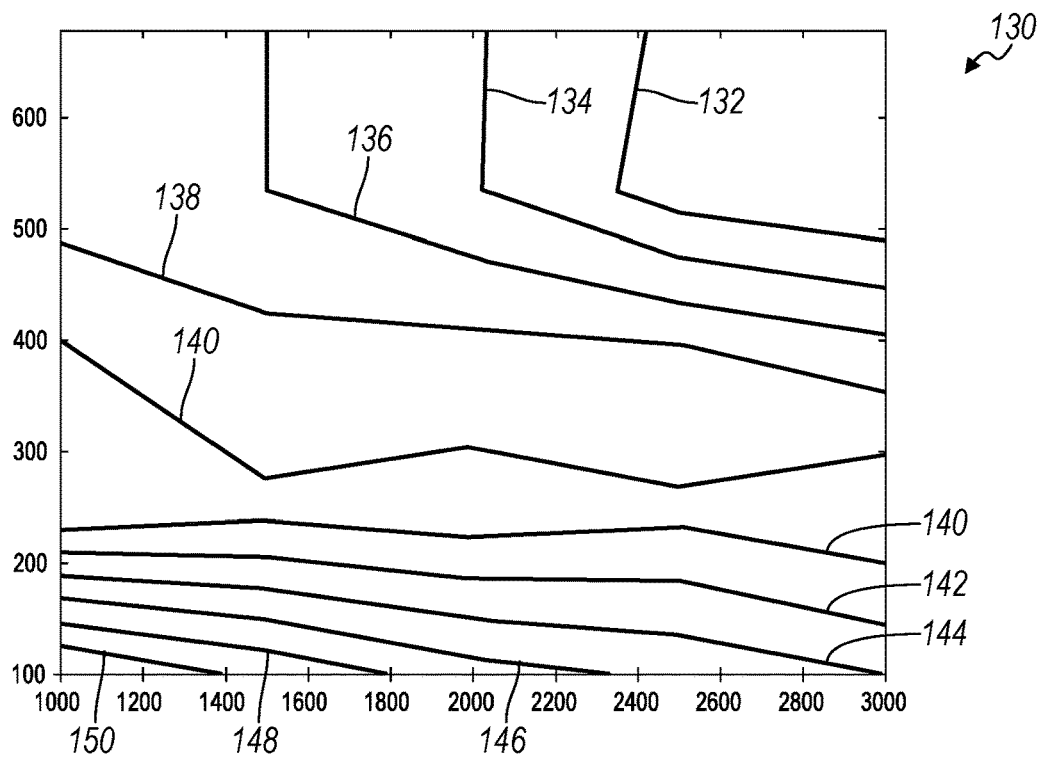
FIG. 5 is an exemplary graph with engine speed (RPM) on the horizontal (X) axis and air per cylinder (APC) in milligrams on the vertical (Y) axis illustrating the exhaust valve maximum opening position (EMOP) in degrees for a constant torque engine output at a valve state transition.

Referring now to FIG. 5, in order to achieve the desired constant engine torque output during low to high or high to low cam and intake valve lift transitions, it is also necessary to adjust the relative position (phase) of the exhaust valves 64 with the exhaust camshaft phaser 58. FIG. 5 is also an exemplary graph 130 with engine speed (RPM) on the horizontal (X) axis and air per cylinder (APC) in milligrams on the vertical (Y) axis which illustrates the exhaust valve maximum opening position (EMOP) in degrees which achieves this goal. In practice, the graph 130 is embodied in a look-up table utilized by the present method and includes several lines or curves which represent combinations of air per cylinder and engine speed which dictate the corresponding maximum opening position of the exhaust valves 64 (illustrated in FIG. 1) to which the exhaust cam phaser 58 (also illustrated in FIG. 1) adjusts the exhaust cam 16 prior to the high to low or low to high intake cam and valve lift shift, in order to provide constant engine torque output during the shift. From upper right to lower left in the graph 130 of FIG. 5, the curve 132 represents −105°, the curve 134 represents −100°, the curve 136 represents −95°, the curve 138 represents −90°, the curves 140 represent −85°, the curve 142 also represents −90°, the curve 144 also represents −95°, the curve 146 also represents −100°, the curve 148 represents −105° and the curve 150 represents −110°. Once again, it should be understood that the data of FIG. 5 are illustrative, are derived from analysis of a particular engine and are is provided by way of example. Values for other engines will vary depending upon, for example, engine size, horsepower output, aspiration, fuel type and other mechanical and operational variables.

Figure 6:
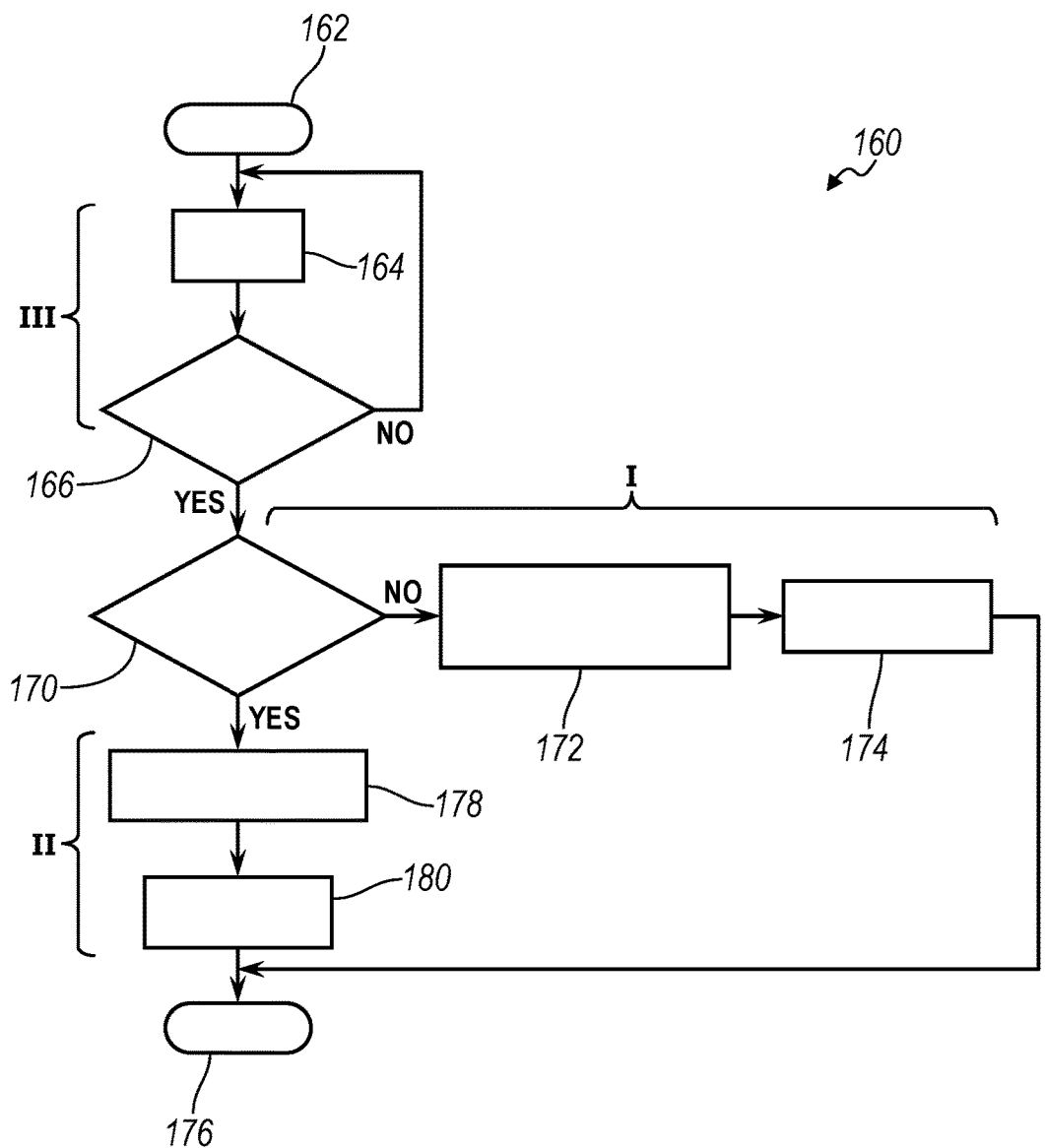
FIG. 6 is a flow chart of the method of transitioning intake valves of an internal combustion engine between a first lift state and a second lift state according to the present disclosure.

Referring now to FIG. 6, a flow chart illustrating the steps of the method of performing intake cam and valve lift state transitions is generally designated by the reference number 160. The method 160 includes a start or initializing step 162 in which registers are cleared or reset and other initializing steps undertaken, after which the method 160 proceeds to a data acquisition (process) step 164 wherein engine conditions such as speed, manifold air pressure, manifold mass air flow, crankshaft angle, angles of the phasers 54 and 58 and other variables are read in order to determine other variables such as indicated engine torque (see FIG. 3) and prepare for a possible intake valve and cam lift transition. The method 160 then encounters a first decision point 166 which inquires whether, due to, for example, operating conditions or a request from the engine control module 50 (illustrated in FIG. 1), a lift transition has been requested. If it has not, the decision point 166 is exited at NO and the method returns to the data acquisition step 164.

If the first decision point 166 is exited at YES, the method 160 moves to a second decision point 170 which inquires whether the intake camshaft 16 and the exhaust camshaft 56 are in positions at which a lift transition can be undertaken. As utilized here, "positions at which a lift transition can be undertaken," means cam phase positions at which a constant engine torque output across the low to high or high to low lift transition will occur. If they are not, the second decision point 170 is exited at NO and a second process step 172 is entered which requests that the intake and exhaust cam phasers 54 and 58 move their respective camshafts 16 and 56 to transition positions. See FIGS. 4 and 5 and the accompanying text. Based upon this request, a subsequent third process step 174 actuates the cam phasers 54 and 58. After this action, the method terminates at the end step 176.

It should be understood that under certain operating conditions, it may not be possible to adjust the cam phasers 54 and 58 to positions that provide the desired constant engine torque output across the lift transition. In such situations, the lift transition torque variation may further be reduced by utilizing engine spark retard.

Returning to the second decision point 170, if the intake camshaft 16 and the exhaust camshaft 56 are in positions at which a lift transition can be undertaken, again according to the above definition, the second decision point 170 is exited at YES, the method 160 moves to a fourth process step 178 which requests a lift mode transition, either from high to low lift or low to high lift, depending upon the request which is, of course, dictated by current operating conditions. Then, the fifth and final process step 180 actuates the cam lift actuator 40, illustrated in FIG. 1, in accordance with the request from the fourth process step 178, to effect a change between intake cam and valve lift states, either from high to low lift or low to high lift. Again, the method 160 terminates at the end step 176.

Referring now to FIGS. 6, 7A, 7B, 7C and 7D, four graphs of engine operating parameters before, during and after a transition from a high lift cam state to a low lift cam state are illustrated. The horizontal (X) axis in all graphs is time, extending from the time when a change in lift state is requested (A), through a delay period of between approximately 300 to 500 milliseconds during which the cam phasers 54 and 58 are adjusted to positions according to FIGS. 4 and 5 to achieve a constant engine torque output before and after the cam lift state shift (B), the lift state is changed (C) and operation in the new lift state commences (D).

Note that a first third of the graphs are designated by a Roman numeral I which corresponds and refers to a phase I portion of the method 160 appearing in FIG. 6 and that occupies between approximately 300 milliseconds and 500 milliseconds, that a second third of the graphs are designated by a Roman numeral II which corresponds and refers to a phase II portion of the method 160 appearing in FIG. 6 and that occupies approximately 10 milliseconds, and that a final third of the graphs are designated by a Roman numeral III which corresponds and refers to a phase III portion of the method 160 appearing in FIG. 6 and that occupies approximately 90 milliseconds.

Figure 7A:
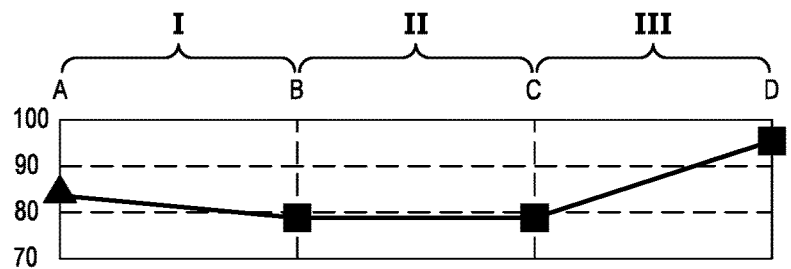
FIGS. 7A, 7B, 7C and 7D are interrelated graphs over time of operating conditions of an internal combustion engine transitioning between a high lift state and a low lift state of intake valves according to the present disclosure.
Figure 7B:
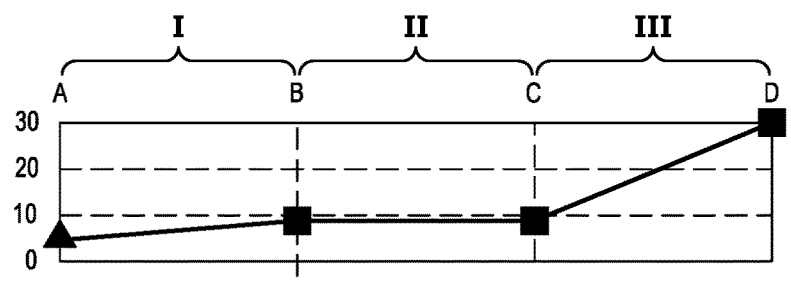
Figure 7C:
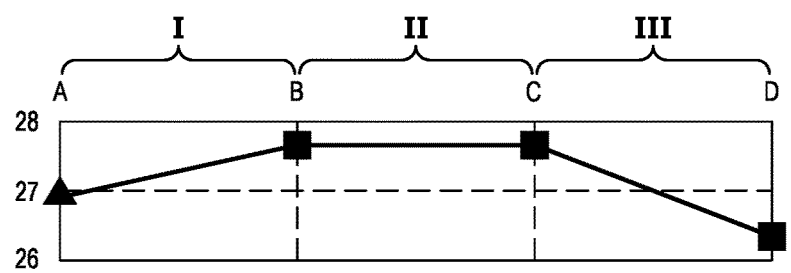
Figure 7D:
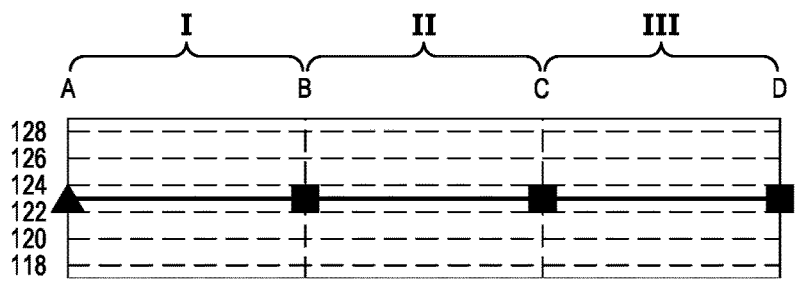

FIG. 7A presents manifold absolute pressure (MAP) on kiloPascals, FIG. 7B presents the intake cam position in degrees, FIG. 7C presents the exhaust cam position in degrees and FIG. 7D presents the engine torque output in Newton meters. Note that FIG. 7D illustrates that fact that the goal of the present method has been achieved as the engine output torque remains constant during the change of cam and valve lift state from high to low.

It should be understood that while FIGS. 7A, 7B, 7C and 7D present data relating to a change of the cam and valve lift state from high to low, the method of changing from a low to a high cam and valve lift state is essentially the same. While the data values will be different, the method again starts on the left side of the graphs at (A) and moves sequentially through the positions (B). (C), and (D) at the specified time intervals.

The foregoing disclosure is merely exemplary in nature and variations that do not depart from the gist of the disclosure are intended to be, and should be considered to be, within the scope of the disclosure. Such variations are not to be regarded as departures from the spirit and scope of the disclosure.

What is claimed is:

1. A method of transitioning between two intake valve lift states in an internal combustion engine, comprising the steps of:
    providing an instruction to shift an intake valve lift state from a first state to a second state,
    determining current angular positions of an intake cam and an exhaust cam,
    determining if an intake cam and an exhaust cam are in angular positions wherein the instructed shift will result in constant engine torque output before and after the commanded shift,
    adjusting a phase of the intake cam and the exhaust cam to provide constant torque before and after the instructed shift,
    commanding an intake cam transition from a first lift state to a second lift state and wherein an exit threshold of the intake cam transition from the first lift state to the second lift state is lower than an entrance threshold of the intake cam transition from the first lift state to the second lift state.

2. The method of transitioning between two intake valve lift states of claim 1 wherein the instruction to shift the intake valve lift state is generated in an engine control module.

3. The method of transitioning between two intake valve lift states of claim 1 further including the step of retarding engine spark when commanding the intake cam transition.

4. The method of transitioning between two intake valve lift states of claim 1 wherein the step of adjusting the phase of intake and exhaust cams delays the step of commanding the intake cam transition.

5. The method of transitioning between two intake valve lift states of claim 1 further including the step of utilizing look up tables to determine camshaft phases which provide constant engine torque output under current operating conditions at two cam lift states.

6. The method of transitioning between two intake valve lift states of claim 1 further including the step of polling a plurality of engine sensors to determine current operating conditions.

7. The method of transitioning between two intake valve lift states of claim 6 further including the step of determining engine speed and engine load to calculate engine torque.

8. A method of transitioning between a first intake valve state and a second, distinct valve state in an cylinder of an internal combustion engine, comprising the steps of:
    providing an instruction to shift an intake valve lift state from the first state to the second state,
    determining a instantaneous angular position of an intake cam and an exhaust cam,
    determining if an intake cam and an exhaust cam are in positions wherein the commanded shift will result in constant engine torque output before and after the commanded shift,
    adjusting the instantaneous angular position of the intake cam and the exhaust cam to provide constant torque before and after the commanded shift,
    commanding an actuator to shift an intake cam assembly from the first lift state to the second lift state and wherein an exit threshold of the actuator to shift an intake cam assembly from the first lift state to the second lift state is lower than an entrance threshold of the actuator to shift an intake cam assembly from the first lift state to the second lift state.

9. The method of transitioning between a first intake valve state and a second valve state in a cylinder of an internal combustion engine of claim 8 wherein the first state is a high lift cam state providing performance and the second state is a low lift cam state providing fuel economy.

10. The method of transitioning between a first intake valve state and a second valve state in a cylinder of an internal combustion engine of claim 8 wherein the first state is a low lift cam state providing fuel economy and the second state is a high lift cam state providing performance.

11. The method of transitioning between a first intake valve state and a second valve state in a cylinder of an internal combustion engine of claim 8 wherein the instruction to shift the intake valve lift state is generated in an engine control module.

12. The method of transitioning between a first intake valve state and a second intake valve state in a cylinder of an internal combustion engine of claim 8 further including the step of retarding engine spark when commanding the actuator to shift the intake cam assembly.

13. The method of transitioning between a first intake valve state and a second intake valve state in a cylinder of an internal combustion engine of claim 8 wherein the step of adjusting the phase of intake and exhaust cams delays the step of commanding an actuator to shift the intake cam assembly.

14. The method of transitioning between a first intake valve state and a second intake valve state in a cylinder of an internal combustion engine of claim 8 further including the step of utilizing look up tables to determine camshaft phases which provide constant engine torque output under current operating conditions at two cam lift states.

15. A method of transitioning between intake valve states in an internal combustion engine, comprising the steps of:
monitoring current operating conditions of the internal combustion engine,
determining that the current operating condition require a change in intake valve lift state,
providing an instruction to shift an intake valve lift state from a first lift state to a second lift state,
determining current phases of an intake cam and an exhaust cam,
adjusting phases of the intake cam and exhaust cam to provide constant torque before and after the commanded shift,
commanding an intake cam transition from the first lift state to the second lift state and wherein an exit threshold of the intake cam transition from the first lift state to the second lift state is lower than an entrance threshold of the intake cam transition from the first lift state to the second lift state.

16. The method of transitioning between intake valve states of an internal combustion engine of claim 15 further including the step of utilizing look up tables to determine intake and exhaust cam phases which provide constant engine torque output under current operating conditions at two cam lift states.

17. The method of transitioning between intake valve states in an internal combustion engine of claim 15 wherein the instruction to shift the intake valve lift state is generated in an engine control module.

18. The method of transitioning between intake valve states in an internal combustion engine of claim 15 further including the step of retarding engine spark when commanding the intake cam transition.

19. The method of transitioning between intake valve states in an internal combustion engine of claim 15 further including the step of utilizing look up tables to determine the intake and exhaust cam phases which provide constant engine torque output under current operating conditions at two cam lift states.

* * * * *